United States Patent [19]
Smith

[11] 3,966,671

[45] June 29, 1976

[54] POLYESTER COMPOSITION

[75] Inventor: Clive Percy Smith, Wheathampstead, England

[73] Assignee: Imperial Chemical Industries Limited, London, England

[22] Filed: Jan. 27, 1975

[21] Appl. No.: 544,668

[30] Foreign Application Priority Data
Feb. 22, 1974 United Kingdom............... 8150/74

[52] U.S. Cl. .................... 260/40 R; 260/31.2 XA; 260/DIG. 35
[51] Int. Cl.² ........................................ C08K 5/09
[58] Field of Search .... 260/31.2 XA, 40 R, DIG. 35

[56] References Cited
UNITED STATES PATENTS
3,368,995   2/1968   Furukawa et al. ............... 260/40 R
3,671,487   6/1972   Abolins ........................... 260/40 R FOREIGN PATENTS OR APPLICATIONS
1,282,679   7/1972   United Kingdom Primary Examiner—Donald E. Czaja
Assistant Examiner—S. M. Person
Attorney, Agent, or Firm—Cushman, Darby & Cushman

[57] ABSTRACT

Glass-filled compositions containing saturated thermoplastic polyesters and aliphatic carboxyl-containing materials of low molecular weight having shear-dependent melt viscosity characteristics.

10 Claims, 1 Drawing Figure

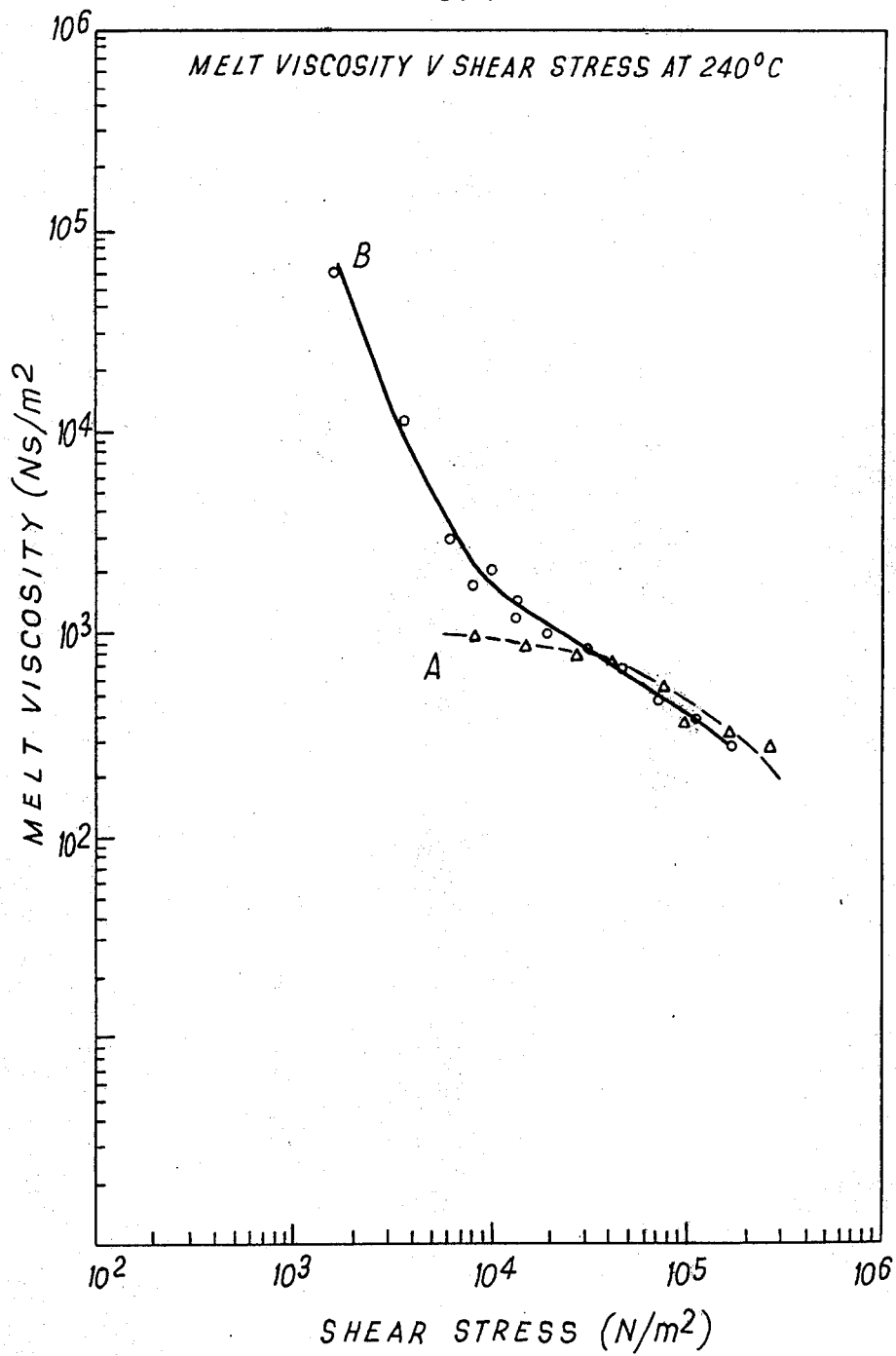

POLYESTER COMPOSITION

This invention relates to thermoplastic polyester compositions. Thermoplastic crystallisable polyesters made from saturated dihydric alcohols and saturated aromatic dicarboxylic acids are well known for use as moulding powders, particularly when reinforced with fillers such as glass fibres. In some applications of reinforced moulding powders it is advantageous for the composition to exhibit a high melt viscosity when subjected to low shear conditions whilst having a low melt viscosity when subjected to high shear conditions such as encountered during fabrication of the composition in moulding processes such as injection moulding into shaped articles.

According to the invention there is provided a reinforced polyester composition comprising a crystalline thermoplastic linear polyester, 2 to 80 percent by weight of the composition of a reinforcing filler and sufficient of an aliphatic carboxylic acid or a salt thereof to increase the melt viscosity of the composition under low shear conditions, wherein the aliphatic carboxylic acid or salt thereof contains from 1 to 8 carbon atoms when the acid is monobasic and from 2 to 16 carbon atoms when the acid is dibasic. In order that the additive is effective in giving shear-dependent melt viscosity characteristics it is necessary that it should not be appreciably volatile under the processing conditions employed.

Suitable polyesters are those derived from dihydric alcohols and saturated aromatic dicarboxylic acids or their derivatives, particularly those based on terephthalic acid or 1:2-bis(4-carboxyphenoxy) ethane such as poly(ethylene terephthalate) poly(ethylene-ethane-1:2-di(oxy-4-benzoate) and poly(tetramethylene terephthalate) and copolyesters thereof. The preferred polyester is a polymer in which at least 80 percent by weight of the repeat units in the polymer chain are tetramethylene terephthalate units.

The aliphatic carboxylic acid of the composition is preferably in the form of a metal salt, particularly an alkali metal salt. The most effective of these materials are of low molecular weight, sodium and potassium acetate being particularly effective. In addition to the volatility of the additive being important any additive used should not react with the polyester to increase its molecular weight significantly because such compositions may no longer show the shear-dependent characteristics of the invention. The additive should also be thermally stable in the melt of the polyester because decomposition might result in discolouration of the polyester composition.

Any reinforcing filler which improves the tensile strength and flexural modulus of the composition may be employed although glass fibre is the preferred filler. Alternative fillers include ballotini, asbestos and mica. Mixtures of fillers, such as glass and ballotini or glass and mica, may also be employed.

The compositions of the invention exhibit a melt viscosity corresponding to the molecular weight of the polyester when handled under the normal processing conditions which are performed at relatively high shear rates but show the advantage that a high melt viscosity, characteristic of a higher molecular weight polymer, is exhibited under low shear conditions. A particular example of this advantage is the behaviour of the composition containing fire retardants when subjected to flame tests. The high viscosity of the composition under these very severe conditions results in a reduced tendency to drip into the flame. The shear stress exerted on the sample in these flame tests is essentially zero.

In a preferred embodiment of the invention there is provided a reinforced fire-retardant composition comprising a crystalline thermoplastic linear polyester, 2 to 80 percent by weight of the composition of reinforcing filler, a sufficient concentration of fire retardant additive to render the composition self extinguishing according to Underwriters Laboratories Test UL 94 and sufficient of an aliphatic carboxylic acid or a salt thereof to render the composition non-dripping, wherein the aliphatic carboxylic acid or salt thereof contains from 1 to 8 carbon atoms when the acid is monobasic and from 2 to 16 carbon atoms when the acid is dibasic. The tendency of a sample to drip in a burning test is strongly dependent on the thickness of the sample being examined. For the thickness of sample normally used in the UL 94 test (0.125 in) no dripping problem is apparent in control polyester compositions if the polyester has a sufficiently high molecular weight (as indicated by intrinsic viscosity measurements) and has an adequate level of fire retardants to provide a self extinguishing composition. In order to demonstrate the effectiveness of the additives of the invention it is necessary to use sample thickness of 0.0625 in. or less in the method of UL 94. Under these conditions the control glass-filled fire-retardant polyester compositions normally exhibit dripping whereas compositions containing sufficient of the carboxylic additive of the invention are non-dripping.

A further example of the value of a material exhibiting a shear dependent viscosity is in the blow moulding process. Although this process is normally operated in the absence of reinforcing fillers up to about 10 percent of fillers such as glass fibre may be present when a blow moulding of high rigidity is required. In the blow moulding process the material being blown should be of high viscosity so that the blown article maintains a stable shape until cooled below the softening point of the material. It may not be practicable to obtain this high viscosity by using a polyester of high molecular weight because difficulty could be experienced in handling the high viscosity melt of such a material under high shear conditions.

It has been found that the shear-dependent viscosity effect is obtainable in the presence of a wide variety of other additives and the invention is therefore particularly useful in the fields of thermoplastic polyester moulding powders where a variety of other additives such as non-reinforcing fillers, pigments, stabilisers, lubricants and fire-retardant chemicals may be included.

It will be appreciated that the concentration of the aliphatic carboxylic material required to produce a significant increase in melt viscosity under low shear conditions or to produce non-dripping compositions will depend on many factors including the type of carboxyl containing additive, the type of thermoplastic polyester, the amount of other materials present, particularly where those other materials exert a synergistic effect, and not least the shear conditions obtaining in a particular application for the compositions. In general a useful effect is not obtained unless the melt viscosity can be increased by at least 5 percent measured under the shear conditions obtaining in the envisaged application in comparison with compositions not containing the prescribed additives. The preferred concentrations of the carboxylcontaining additive are between 0.1 and 2.0 percent by weight of the composition.

Surprisingly, the effect observed is much more significant in the presence of glass fibre than in the polyester alone, suggesting that the glass fibre exerts a synergistic effect in the process. With certain polyesters the carboxyl containing additive may even decrease the viscosity at low shear rates.

The glass fibre used may be any of the forms which are commercially available for use in reinforcing thermoplastics. Such glass fibres are invariably coated with surface finishes consisting of various materials, such as film-formers to protect the fibres from abrasion, and adhesion promoters, such as silanes, to improve the bond between the glass fibre and the thermoplastic material. The compositions may contain from 2 to 80 percent by weight of the composition of glass fibre, although compositions containing from 5 to 50 percent by weight of glass are preferred.

The fire retardants for use in the invention may be selected from the wide variety of known fire retardants particularly halogenated and phosphoruscontaining organic compounds. The preferred compounds for use with polyester moulding powders and bromine containing materials such as brominated benzene or toluene, brominated diphenyls or diphenyl ethers and brominated phthalic anhydride. Compounds containing at least 50 percent by weight of elemental halogen are particularly suitable. Examples are hexa bromobenzene pentabromotoluene, penta and deca bromodiphenyl, penta and deca bromodiphenyl ether and tetrabromophthalic anhydride. When halogenated compounds are used it is advantageous to include compounds of arsenic, antimony or bismuth, particularly antimony oxide, as these can act synergistically with the halogenated compound to produce an enhance effect.

The concentration of fire retardant required to render the compositions self extinguishing according to the test method of UL 94 is normally between 3 and 20 percent of fire retardant by weight of the composition, optionally together with between 2 and 10 percent of a compound of arsenic, antimony or bismuth. Typical compositions contain 5 to 15 percent of brominated fire retardants together with 3 to 8 percent of antimony oxide.

For the case of compositions containing poly (tetramethylene terephthalate), 30 percent by weight of glass fibre and sodium acetate it has been found that 0.1 percent sodium acetate produces approximately a 5 to 10 percent decrease in melt flow index as measured at 240°C using the melt flow test of ASTM D1238 - 70 using a die diameter of 2.095 mm a die land length of 8 mm and a total load including the plunger of 2.16 kg. This test operates under conditions of low shear stress (approximately $2 \times 10^4 N/m^2$).

The carboxyl-containing additives used in the invention are conveniently blended with the polyester in a melt blending process. A suitable apparatus for carrying out the process is a screw extruder particularly an extruder capable of removing volatile materials, such as water, during the blending operation. The additives may be blended into the polyester during the polymerisation of the polyester but unless they are inert to the polymerisation reaction they should only be added to the polymerisation vessel at the end of the polymerisation. It is preferred to carry out the blending operation in a screw extruder together with the addition of the glass fibres and any other materials, such as fire retardants, to be included in the final composition.

The compositions of the invention exhibit excellent physical properties in addition to those herein described and have many uses. They are suitable for many automobile components such as distributor caps and rotors, ignition coil bobbins, dimmer switches and ratchets.

The invention is illustrated by the following examples.

COMPARATIVE EXAMPLE A

Poly(tetramethylene terephthalate) 1.96 kg was compounded with anhydrous sodium acetate (40g) in a 38 mm single screw vented extruder at a temperature of 240°C. The melt flow index of the sample was measured using the ASTM test described with the specified conditions for the die, load and temperature. A melt flow index of 11.8 was obtained. A value of 18 was obtained for the basic polyester not containing sodium acetate. These figures represent a rate of decrease in melt flow index of only 1.7 percent for the addition of each 0.1 percent sodium acetate.

EXAMPLE 1

Compositions containing poly(tetramethylene terephthalate) with 30 percent by weight of glass fibre were compounded with 0.1 and 0.5 percent respectively by weight of sodium acetate (all percentages being based on the total weight of the composition). The compounding was carried out in a screw extruder at 240°C. The table below shows that a significant reduction in the melt flow index (corresponding to an increase in melt viscosity) is observed. The molecular weight of the polymer of the samples was determined in a 1 percent by weight solution in ortho-chlorophenol at 25°C. It is clear that the molecular weight of the polyester is not significantly affected by the presence of the sodium acetate and that the melt flow index figures represent a drop of about 5 to 14 percent for the addition of each 0.1 percent sodium acetate.

| Sodium Acetate (%) | Melt Flow Index | Intrinsic Viscosity |
|---|---|---|
| 0 | 9.0 | 0.92 |
| 0.1 | 8.5 | — |
| 0.5 | 2.5 | 0.88 |

The effect of shear stress on melt viscosity was examined for the samples containing 0 and 0.5 percent sodium acetate and is clearly shown in the accompanying FIG. 1 in which curve A and curve B show the results obtained on the compositions containing 0 and 0.5 percent of sodium acetate respectively. These results were obtained by capillary viscometry as described in Chapter 2 of the book "Viscometry" published by E Arnold and Co. in 1949. Capillaries of length/diameter ration 12.7:1 and diameters of 1, 2 and 4 mm were used.

EXAMPLE 2

Poly(tetramethylene terephthalate) was compounded together with 2 percent by weight of the polymer of sodium acetate and a fire retardant system consisting of pentabromotoluene (8 percent by weight)

antimony trioxide (3 percent by weight) all percentages being based on the total weight of the composition. The fire retardancy properties of the composition were compared with those of the same composition not containing sodium acetate according to the test procedure of the Underwriters Laboratories Test No. UL 94 (September 1972) specifying the vertical burning test for classifying materials. A sample thickness of 0.0625 in. was used.

It was observed that whereas the control composition not containing sodium acetate showed a marked tendency to dripping in the burning test, this tendency was suppressed by the presence of sodium acetate in the composition.

EXAMPLE 3

Compositions containing poly(tetramethylene terephthalate) containing 30 percent glass, 11 percent tetrabromophthalic anhydride and 3 percent antimony trioxide were compounded with various levels of sodium acetate according to the procedure of Comparative Example A. The effect on the melt flow index is shown in the accompanying table.

| Sodium Acetate (%) | Melt Flow Index |
| --- | --- |
| 0 | 11.0 |
| 0.5 | 6.7 |
| 1.0 | 2.2 |
| 2.0 | 0.6 |

All percentages are based on the total weight of the composition.

EXAMPLE 4

The procedure of Example 1 was repeated except in that the sodium acetate was replaced with 1 percent potassium acetate by weight of the glass-filled composition. The control sample with no potassium acetate present had a melt flow index under the standard conditions of 3.8 whereas the acetate treated composition had a melt flow index of 0.5.

COMPARATIVE EXAMPLE B

A sample of poly(ethylene terephthalate) having an intrinsic viscosity of 0.65 as measured in a 1 percent by weight solution of o-chlorophenol at 25°C was compounded with 1 percent by weight of sodium acetate in a single screw vented extruder at a temperature of 285°C. The melt flow index of the polyester and the polyester containing sodium acetate were found to be 203 and 298 respectively as measured by the ASTM test described but using a temperature of 285°C indicating that the melt viscosity decreased in the presence of sodium acetate when examined under low shear conditions.

EXAMPLE 5

A sample of poly(ethylene terephthalate) used in Comparative Example B was compounded at 285°C in a screw extruder with 30 percent of glass fibre. A separate sample was compounded additionally with 1 percent by weight of the composition of sodium acetate. The melt flow indices for the two samples were 59 and 5 respectively showing a large increase in melt viscosity under low shear conditions.

I claim:

1. A reinforced polyester composition comprising a crystalline thermoplastic linear polyester, 2 to 80 percent by weight of the composition of a reinforcing filler and sufficient of an aliphatic monobasic carboxylic acid or a salt thereof containing 1 to 8 carbon atoms to increase the melt viscosity of the composition under low shear conditions.

2. A reinforced composition according to claim 1 in which the reinforcing filler is selected from the group consisting of glass fibre, ballotini, mica and asbestos.

3. A composition according to claim 1 in which the concentration of aliphatic carboxylic acid or salt thereof is from 0.1 to 2.0 percent by weight of the composition.

4. A composition according to claim 1 in which the thermoplastic linear polyester is a polymer in which at least 80 percent by weight of the units in the polymer chain are tetramethylene terephthalate units.

5. A composition according to claim 1 containing a sufficient concentration of fire retardant additives to render the composition self-extinguishing according to Underwriters Laboritories Test UL 94 and sufficient of the aliphatic carboxylic acid or salt thereof to render the composition non-dripping in said test.

6. A composition according to claim 5 containing from 3 to 20 percent by weight of the composition of a brominated fire retardant additive.

7. A composition according to claim 6 which included from 2 to 10 percent by weight of the composition of a compound of arsenic, antimony or bismuth.

8. A method of increasing the melt viscosity of reinforced polyester compositions under low shear conditions which comprises adding to a crystalline thermoplastic linear polyester and reinforcing filler composition, an aliphatic monobasic carboxylic acid or a salt thereof containing 1 to 8 carbon atoms in an amount sufficient to increase the melt viscosity of said composition under low shear conditions.

9. A method according to claim 8, wherein said acid or salt thereof is added in an amount from 0.1 to 2.0 percent by weight of said composition.

10. A method according to claim 9 wherein said acid or salt thereof is selected from the group consisting of sodium acetate and potasium acetate.

* * * * *